No. 12,124. REISSUED JUNE 23, 1903.

J. F. AMES.

PRINTING PRESS.

APPLICATION FILED JAN. 20, 1902.

2 SHEETS—SHEET 1.

Witnesses,

J. H. Towse

F. P. Kersten.

Inventor,

John F. Ames by Dewey Strong & Co.

Attys.

No. 12,124. REISSUED JUNE 23, 1903.

J. F. AMES.

PRINTING PRESS.

APPLICATION FILED JAN. 20, 1902.

2 SHEETS—SHEET 2.

Witnesses,

J. H. Souse

F. P. Kersten.

Inventor,

John F. Ames by Dewey Strong & Co.

Attys

No. 12,124. Reissued June 23, 1903.

UNITED STATES PATENT OFFICE.

JOHN F. AMES, OF PORTLAND, OREGON.

PRINTING-PRESS.

SPECIFICATION forming part of Reissued Letters Patent No. 12,124, dated June 23, 1903.

Original No. 686,380, dated November 12, 1901. Application for reissue filed January 20, 1902. Serial No. 90,447.

*To all whom it may concern:*

Be it known that I, JOHN F. AMES, a citizen of the United States, residing at Portland, county of Multnomah, State of Oregon, have invented an Improvement in Printing-Presses; and I hereby declare the following to be a full, clear, and exact description of the same.

My invention relates to improvements in printing-presses.

It consists in a novel construction of the cylinder and means for securing the type or characters thereon from which the impression is to be made, means in connection therewith by which the type or printing surface is protected from undue pressue from the surface on which the printing takes place, means by which the ink is prevented from being transferred to the protecting-strips, means whereby all the devices are securely locked to the cylinder by a single operation, and details of construction to be more fully described hereinafter.

Figure 1:
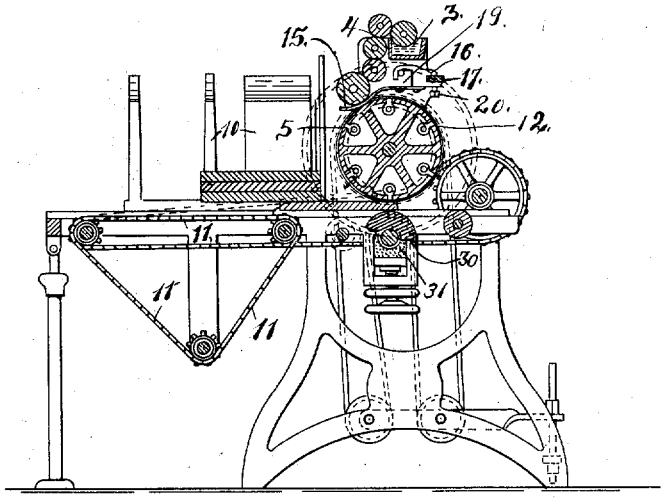
Figure 2:
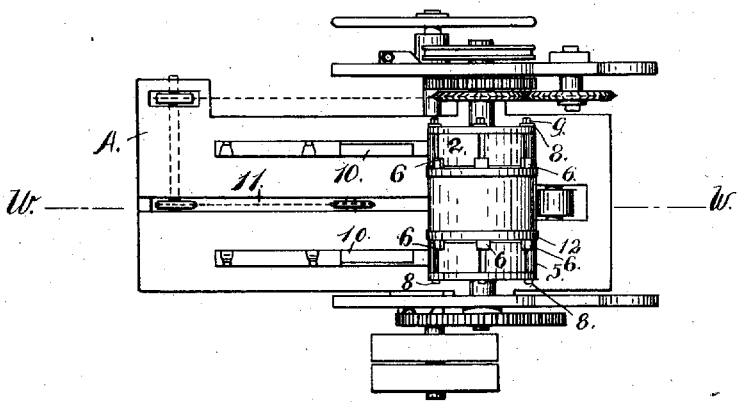
Figure 3:
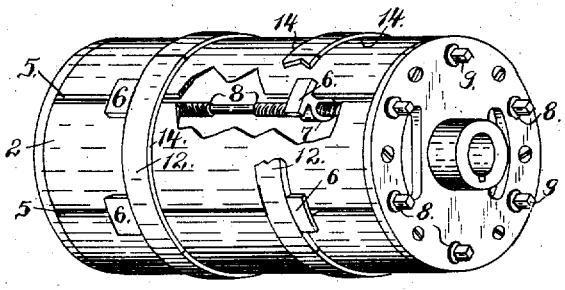
Figure 4:
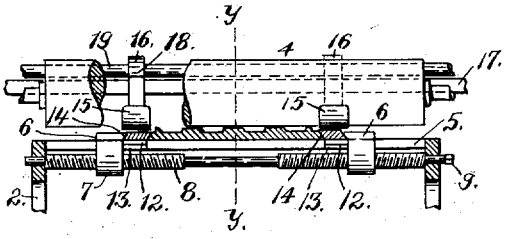
Figure 5:
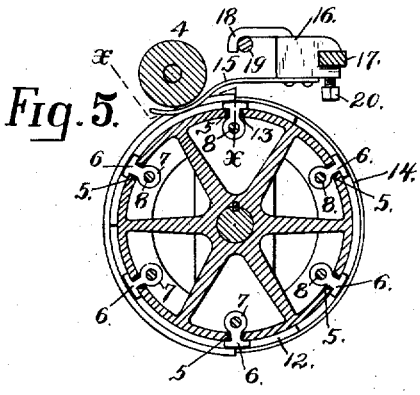
Figure 6:
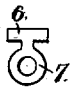
Figure 7:
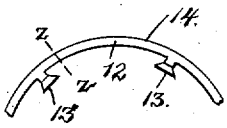
Figure 8:
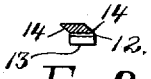

Referring to the accompanying drawings, Figure 1 is a longitudinal section on the line *w w*, Fig. 2. Fig. 2 is a plan, the ink-well and distributing-rollers being omitted. Fig. 3 is a view of the type-cylinder, the type-form being omitted. Fig. 4 is a longitudinal section on the line *x x*, Fig. 5. Fig. 5 is a transverse section on the line *y y*, Fig. 4. Fig. 6 is an end view of a clamp. Fig. 7 is a side elevation of a bearing-strip. Fig. 8 is a transverse section on the line *z z*, Fig. 7.

My invention is especially designed for the purpose of securing printing types or characters upon a revolving cylinder, so that they may be employed for printing bags, the wooden sides or parts of which boxes are constructed, and for like purposes.

The press consists of a bed A, upon which the material to be printed is supported, a cylinder 2, adapted to carry the type, engraved surface, or form from which the impression is to be made, an ink-well 3, and distributing-rollers 4 so disposed that ink from the well is transferred as desired to the form or printing surface during the revolution of the cylinder. Any suitable or well-known mechanism or gearing may be employed to drive the various parts in unison, consisting of driving pulleys and gears, which may be arranged as shown in the drawings. The cylinder is made with longitudinal slots or channels, as at 5, and in line with these channels the locking-clamps 6 are movable. These clamps have shanks extending through the slots 5, and within and interior to the cylinder are formed the nuts 7, which are adapted to travel upon the screws 8. These screws are of any suitable number and extend longitudinally from end to end of the cylinder, having shoulders which abut against the inner ends of the cylinders, and thus retain the screws in position. The ends of the screw-shanks extend through one end of the cylinder and are made of convenient form, as shown at 9, to receive a wrench or means by which they may be rotated. Each screw is made with right and left threads, respectively, upon opposite sides of the central line, and when the screws are turned in one direction the locking clamps or lugs 6 are caused to simultaneously approach and clamp the edges of the printing block or form or intervening strips, so as to firmly lock the form upon the cylinder. By reversing the turn of the screws the clamps are retracted, thus allowing the form to be removed. This insures each oppositely-disposed pair of clamps being moved in unison and equally to grip the opposite sides of the form or plate at the same instant by turning a single screw in one direction, and as each pair of clamps is movable with relation to a common circumferential line it will be manifest that all the clamps will exert an even pressure upon the form-plate from end to end.

When this press is employed for printing the boards from which boxes are made, a difficulty arises from careless sawing of the boards, which may vary as much as a quarter of an inch, more or less, in thickness, and which therefore will bring very uneven pressure and strain upon the printing-surface. These boards are piled in considerable numbers between upright guides or holders 10 upon the bed A, and by means of a chain 11, having lugs projecting from it at intervals, the lowermost of the boards in the pile is advanced so as to pass between the printing-cylinder and a corresponding pressure-roller below, by which sufficient pressure is brought to bear to imprint the words or characters upon the wood. When the apparatus is set to properly print the thinnest of these boards, it will be manifest that when thicker boards pass between the rollers a serious strain and pressure is brought to bear upon the type-surface. These surfaces when used for printing boxes are usually made of very hard metal, which is often broken by unequal strains, and in order to protect the type-surface from the strains caused by the difference in thickness of the boards I have shown bearing-strips curved to the same form as the type-surface, fitting the cylinder and having tongues, as at 13, which extend into the slots 5 of the cylinder. These guard-strips 12 are interposed between the clamping-lugs 6 and the edges of the form, and the meeting edges of the two and also the contiguous edges of the locking-clamps are beveled, as shown at 14, or otherwise made so that when they are pressed together the protecting-strips act to hold the printing-form in place, and the clamps in turn lock the protecting-strips. These strips are made of a sufficiently less height than the type or printing surface so that a good impression of the latter will be made upon any material upon which the printing is to take place; but when by reason of greater thickness of the material an undue pressure is brought upon the printing-surface this pressure is received upon the parallel protecting-strips 12, and the printing-surface is thus relieved of all pressure except sufficient to secure a good impression. These strips afford protection when thick boards are passed through the press, because the lower cylinder 30 has underneath it a heavy piece of rubber 31 at each end of the shaft, so that when any extra pressure is occasioned by the passing of a board of unusual thickness between the rollers the rubber yields and permits the thick board to pass through. If the lower cylinder was not supported by these rubbers, but the shaft fixed to move rigidly in the boxes, whenever a thick board was passed between the cylinders the brand and even the protecting-strips would be forced into the board to the extent of the extra thickness and the press would stop or something would break. The type or printing surface being composed of letters or a design more readily presses into the brand than would the protecting-strips on the side, which presents the planed solid surface. The chief strain on the type or printing surface is when it first comes in contact with the board to be printed. If, for instance, the press is set to print a board one-half inch thick and one three-fourths inch thick is presented by the feeding-lug to be printed, the brand as it revolves on the upper cylinder would strike the board with a severe blow. The protecting-strips by passing entirely around the cylinder, or at least half-way, receive the board as soon as it is pushed in by the feeding-lug on the chain above the lower cylinder, so that when the brand is presented to the board the lower cylinder has been depressed by the protecting-strip sufficiently to relieve the type or printing surface of all strain. In order to prevent the ink on the distributing-rollers from being deposited upon these strips and eventually making unseemly marks upon the material which is to be printed, I have shown protecting strips or guards, which consist of thin, preferably elastic, plates of metal 15, so curved as to partially follow the contour of the inking-roller and to lie between this roller and the strips 12, which are clamped upon each side of the printing-surface. The convexed lower surfaces of the guards 15 rest upon the curved protecting-strips 12, and any ink which may have been distributed upon the inking-roller upon the width of the surface to be printed will be thus prevented from being deposited upon the protecting-strips 12. These guards 15 may be supported in any suitable or convenient manner from parts of the printing-press. As here shown, they are fixed to metal blocks 16, which are grooved or channeled to fit a bar 17, which extends conveniently across the frame of the apparatus, and by means of hooks, as at 18, they are supported upon a rod or shaft 19, extending across from one side to the other of the frame. This allows them to be readily removed whenever desired, and they may be locked in position by set-screws, as at 20.

Having thus described my invention, what I claim, and desire to secure by Letters Patent, is—

1. The combination in a printing-press of a cylinder adapted to carry the printing-surfaces, slots or channels made longitudinally in the cylinder, clamps guided and movable in said slots and having threaded interior nuts, segmental guard-strips interposed between the adjacent edges of the clamps and form or printing surface and of less height than said surface, whereby undue pressure upon said surface is relieved, and screws passing through said nuts and turnable so as to advance the clamps and cause the strips to grip the printing block or form, or release it.

2. The combination in a printing-press of a cylinder, a form or printing surface fitted thereto, said cylinder having parallel longitudinal slots or channels made in its surface, clamps adapted to grip the opposite edges of the form and having shanks passing through the slots and interior nuts, parallel screws each having right and left screw-threads at opposite ends passing respectively through the nuts of the clamps upon opposite sides of the printing-plate, said screws having shoulders abutting against the inner ends of the cylinder and projecting through one of the ends having means to which a wrench or device may be applied whereby they may be turned to cause the gripping-clamps to approach or recede in unison.

3. The combination in a printing-press of a cylinder, a type form or plate fitting thereon, clamps and screws by which they are advanced toward or retracted from the plate, curved blocks interposed between the clamps and the plate upon each side and adapted to be interlocked therewith when the clamps are forced against them, inking-rollers adapted to supply ink to the printing-surface, and means for keeping the ink from the blocks upon each side of the printing-plate, consisting of guards interposed between the inking-roller and the blocks.

4. The combination in a printing-press of a cylinder having longitudinal slots in its surface, a printing form or plate fitting the surface of said cylinder, screw-actuated clamps movable in the slots to lock or release the printing-plate, curved strips interposed between the lugs and the plate having the surfaces of such height as to relieve pressure upon the plate, a roller by which ink is applied to the printing-surface, guards interposed between the roller and the curved strips at each side of the printing-plate and blocks to which the guards are secured, said blocks having means for securing them to the supporting parts of the press.

5. The combination in a printing-press of a longitudinally-slotted cylinder, a printing-form curved to fit thereon, clamps slidable in the slots, guard-strips interposed between the edges of the clamps and printing-form, and reversely-threaded screws engaging and actuating the clamps upon opposite sides of the form, said strips having edges adapted to interlock with the edges of the form and clamps.

6. The combination in a printing-press of a longitudinally-slotted cylinder, a curved form or printing-plate upon the cylinder, segmental guards upon each side of the form and having locking edges, said guards having lugs on their inner faces adapted to engage the slots in the cylinder, means engaging the outer edges of the guards, an impression-roller, and yielding journal-boxes therefor whereby the pressure upon the form is regulated.

7. The combination with a printing-cylinder and a form or printing-plate therefor, of clamps guided and movable upon the cylinder at opposite sides of the plate, and means including single substantially equally spaced parallel screws each having right and left threads at opposite ends, and nuts connected with the clamps and fitting the screws, whereby the clamps are simultaneously and equally moved in opposite directions.

8. A printing-cylinder with parallel slots from end to end of its periphery, single screw-shafts turnably journaled interior to each slot, each having right and left screw-threads at opposite sides of the center, a printing form or plate fitting the cylinder-surface, and clamps therefor with nuts fitting each of the right and left screws.

9. The combination with a printing form or plate and a cylinder upon which it fits, of clamps guided and movable between the ends and center of the cylinder, nuts carried by the clamps, single substantially equally spaced parallel shafts each having right and left screw-threads upon opposite ends, and each passing through one pair of the nuts, and means for turning the screw-shafts from one end and in one direction to equally advance or retract the clamps from opposite sides.

10. The combination with a printing-cylinder, and an independent form or plate, of clamps located upon opposite sides of the form, and having oppositely-screw-threaded nuts, single correspondingly-threaded parallel screws each passing through a pair of nuts and turnable to equally advance or retract the clamps on opposite sides in unison and simultaneously grip or release the form.

11. The combination with a printing-cylinder having a series of open slots from end to end parallel with its axis, of a curved form or printing-plate, clamps located at opposite sides of the plate with nuts projected through the cylinder-slots, the pair in each slot having right and left screw-threads respectively and a single shaft having its opposite ends right and left threaded to fit each pair of nuts, and means for turning the shaft.

12. The combination with a printing-cylinder and its form or plate, of parallel shafts with the ends journaled and turnable in the cylinder ends, right and left screw-threads upon opposite ends of each shaft, clamps to fit opposite sides of the form-plate and right and left threaded nuts connected with the clamps, each pair movable simultaneously and equally to or from each other upon a single shaft by turning the shaft.

13. A printing-cylinder and means for securing printing-plates therein consisting of a series of clamps, to grip opposite sides of the plate, said clamps having shanks with nuts on the inner ends, longitudinally-disposed slots in the periphery of the cylinder through which the shanks of the clamps are movable, and parallel, equally-spaced shafts extending between the ends of the cylinder, each having right screw-threads upon one end, and left threads upon the other end, to turn in corresponding threads in the clamp-nuts, whereby both nuts are simultaneously advanced to grip the plate, or retracted.

In witness whereof I have hereunto set my hand.

JOHN F. AMES.

Witnesses:
S. H. NOURSE,
JESSIE C. BRODIE.